US012614736B2

(12) United States Patent
Mailoa et al.

(10) Patent No.: US 12,614,736 B2
(45) Date of Patent: Apr. 28, 2026

(54) FUEL CELL GRAPHENE-BASED MATERIAL FOR CAPTURING CATALYST PARTICLES

(71) Applicant: Robert Bosch GmbH, Stuttgart (DE)

(72) Inventors: Jonathan Mailoa, Cambridge, MA (US); Georgy Samsonidze, San Francisco, CA (US); Soo Kim, Cambridge, MA (US); Mordechai Kornbluth, Brighton, MA (US); Ulrich Berner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 745 days.

(21) Appl. No.: 17/886,209

(22) Filed: Aug. 11, 2022

(65) Prior Publication Data

US 2024/0063402 A1 Feb. 22, 2024

Related U.S. Application Data

(63) Continuation of application No. 16/833,039, filed on Mar. 27, 2020, now Pat. No. 11,631,863.

(51) Int. Cl.

*H01M 4/92* (2006.01)
*H01M 4/86* (2006.01)
*H01M 8/1018* (2016.01)

(52) U.S. Cl.

CPC ......... *H01M 4/926* (2013.01); *H01M 4/8657* (2013.01); *H01M 8/1018* (2013.01)

(58) Field of Classification Search

CPC .................................................. H01M 8/1018
See application file for complete search history.

(56) References Cited

U.S. PATENT DOCUMENTS

| | | | |
|---|---|---|---|
| 8,979,978 | B2 | 3/2015 | Miller et al. |
| 9,680,158 | B2 | 6/2017 | Huang et al. |
| 10,038,200 | B2 | 7/2018 | Kim et al. |
| 10,050,278 | B2 | 8/2018 | Yom et al. |
| 10,170,770 | B2 | 1/2019 | Kurungot et al. |
| 10,696,554 | B2 | 6/2020 | Bedworth et al. |
| 10,886,540 | B2 | 1/2021 | Xie et al. |
| 10,981,120 | B2 | 4/2021 | Liu et al. |
| 11,631,863 | B2 | 4/2023 | Mailoa et al. |

(Continued)

FOREIGN PATENT DOCUMENTS

| | | | |
|---|---|---|---|
| CN | 107268027 | A | 10/2017 |
| DE | 4326757 | A1 | 2/1994 |

(Continued)

OTHER PUBLICATIONS

Bang et al., "CO2 Mineralization Using Brine Discharged from a Seawater Desalination Plant," Minerals, vol. 7, No. 207, Oct. 30, 2017, pp. 1-12, DOI: 10.3390/min7110207.

(Continued)

*Primary Examiner* — Brian R Ohara
(74) *Attorney, Agent, or Firm* — Brooks Kushman P.C.

(57) ABSTRACT

A fuel cell catalyst layer includes a catalyst support, a catalyst material, and a graphene-based material. The catalyst material includes catalyst particles in an atomic form at a beginning of operation or life of the fuel cell catalyst layer. The graphene-based material includes defects capturing dissolved particles ionized from the atomic form after the beginning of operation or life of the fuel cell catalyst layer.

20 Claims, 3 Drawing Sheets

(56) References Cited

U.S. PATENT DOCUMENTS

| | | | |
|---|---|---|---|
| 2011/0124492 A1 | 5/2011 | Loukine et al. | |
| 2012/0021131 A1 | 1/2012 | Borsting et al. | |
| 2012/0149897 A1 | 6/2012 | Jean et al. | |
| 2012/0220446 A1 | 8/2012 | Kishimoto et al. | |
| 2012/0288750 A1 | 11/2012 | Kung et al. | |
| 2013/0022892 A1 | 1/2013 | Hasegawa et al. | |
| 2013/0165353 A1 | 6/2013 | Mazyar et al. | |
| 2013/0252138 A1 | 9/2013 | Zhou et al. | |
| 2013/0344413 A1 | 12/2013 | Kim et al. | |
| 2014/0162167 A1 | 6/2014 | Hong et al. | |
| 2014/0272664 A1 | 9/2014 | Lu et al. | |
| 2014/0322608 A1 | 10/2014 | Claussen et al. | |
| 2015/0247258 A1 | 9/2015 | Diankov et al. | |
| 2015/0303487 A1 | 10/2015 | Kamai et al. | |
| 2016/0093891 A1 | 3/2016 | Rehman et al. | |
| 2016/0251765 A1 | 9/2016 | Botte | |
| 2017/0040082 A1 | 2/2017 | Swett et al. | |
| 2017/0065939 A1 | 3/2017 | Kim et al. | |
| 2017/0092960 A1 | 3/2017 | Serov et al. | |
| 2017/0170487 A1 | 6/2017 | Xie et al. | |
| 2017/0191173 A1 | 7/2017 | Han et al. | |
| 2017/0194656 A1 | 7/2017 | Sinsabaugh et al. | |
| 2017/0296982 A1 | 10/2017 | Swett et al. | |
| 2018/0062181 A1 | 3/2018 | Gath et al. | |
| 2018/0123140 A1 | 5/2018 | Dai | |
| 2018/0145328 A1 | 5/2018 | Mullins et al. | |
| 2018/0145341 A1 | 5/2018 | Sung et al. | |
| 2018/0244524 A1 | 8/2018 | Ozyilmaz et al. | |
| 2018/0311624 A1 | 11/2018 | Lozada et al. | |
| 2018/0337411 A1 | 11/2018 | Ozyilmaz et al. | |
| 2019/0123359 A1 | 4/2019 | Morin et al. | |
| 2019/0280307 A1 | 9/2019 | Ramaswamy et al. | |
| 2019/0341623 A1 | 11/2019 | Lambert | |
| 2020/0127279 A1 | 4/2020 | Roberts et al. | |
| 2020/0127300 A1 | 4/2020 | Prinz et al. | |
| 2020/0147590 A1 | 5/2020 | Imai et al. | |
| 2020/0153004 A1 | 5/2020 | Oh et al. | |
| 2021/0057760 A1* | 2/2021 | Kim | H01M 4/92 |
| 2021/0159528 A1* | 5/2021 | Kim | H01M 4/8825 |
| 2021/0351419 A1* | 11/2021 | Hori | H01M 4/926 |

FOREIGN PATENT DOCUMENTS

| | | |
|---|---|---|
| JP | 2006344428 A | 12/2006 |
| KR | 20140050503 A | 4/2014 |
| KR | 101675494 B1 | 11/2016 |
| KR | 20210120911 A | 10/2021 |
| WO | 2012114108 A1 | 8/2012 |
| WO | 2018231998 A1 | 12/2018 |

OTHER PUBLICATIONS

International Search Report issued Mar. 25, 2021 for PCT/US2020/037629, 3 pages.

T.X. Wu, G.Z. Wang, X. Zhang, C. Chen, Y.X. Zhang, and H.J. Zhao, "Transforming chitosan into N-doped graphitic carbon electrocatalysts," Chemical Communications, vol. 51, p. 1334, 2015, 4 pages.

J. Ying, G. Jiang, Z.P. Cano, L. Han, X.-Y. Yang, and Z. Chen, "Nitrogen-doped hollow porous carbon polyhedrons embedded with highly dispersed Pt nanoparticles as a highly efficient and stable hydrogen evolution electrocatalyst," Nano Energy, vol. 40, p. 88, 2017, 7 pages.

Z. Yan, H. Jin, and J. Guo. "Low-temperature synthesis of graphitic carbon-coated silicon anode materials," Carbon Energy, vol. 1, p. 246, 2019, 7 pages.

J.P. Paraknowitsch, J. Zhang, D. Su, A. Thomas, and M. Antonietti. "Ionic liquids as precursors for nitrogen-doped graphitic carbon," Advanced Materials, vol. 22, p. 87, 2010, 6 pages.

Zhang et al., "Tuning the Electrocatalytic Performance of Ionic Liquid Modified Pt Catalysts for the Oxygen Reduction Reaction via Cationic Chain Engineering", ACS Catal. Aug. 2018, 8244-8254, 11 pages.

Aritonang et al., "Synthesis of Platinum Nanoparticles from K2PtCl4 Solution Using Bacterial Cellulose Matrix", Research Article, vol. 2014, Article ID 285954, 7 pages.

Liu et al., "In situ one-step synthesis of metal-organic framework encapsulated naked Pt nanoparticles without additional reductants", . Mater. Chem. A, Mar. 2015, 8028, 6 pages.

Afsahi et al., "Electrocatalyst synthesized from metal organic frameworks", Journal of Power Sources 239 (2013), 9 pages.

Adlim et al., "Synthesis of chitosan-stabilized platinum and palladium nanoparticles and their hydrogenation activity", Journal of Molecular Catalysis A: Chemical 212 (2004), 9 pages.

Gasteiger el al., "Activity benchmarks and requirements for Pt, PI-alloy, and non-Pt oxygen reduction catalysts for PEMFCs", Nov. 5, 2004, New York, 27 pages.

Schwammlein et al., "Anode Aging during PEMFC Start-Up and Shut-Down: H2-Air Fronts vs Voltage Cycles", Journal of The Electrochemical Society, Dec. 19, 2018, Germany, 11 pages.

Fampiou et al., "Binding of PI Nanoclusters lo Point Defects in Graphene: Adsorption, Morphology, and Electronic Structure", The Journal of Physical Chemistry, Feb. 26, 2012, Massachusetts, 13 pages.

Chen el al., "Comprehensive Enhancement of Nanostructured Lithium-Ion Batter Cathode Materials via Conformal Graphene Dispersion", Nano Letters, Feb. 27, 2017, Illinois, 8 pages.

Zaton et al., "Current understanding of chemical degradation mechanisms of perfluorosulfonic acid membranes and their mitigation strategies: a review", Royal Society of Chemistry, Mar. 13, 2017, France, 30 pages.

Groger el al., "Review—Electromobility: Batteries or Fuel Cells?", Journal of The Electrochemical Society, Oct. 9, 2015, Germany, 19 pages.

Wood et al., "First-Principles-Inspired Design Strategies for Graphene-Based Supercapacilor Electrodes" The Journal of Physical Chemistry, Dec. 13, 2013, California, 12 pages.

Niaei et al., "Hydrogenated defective graphene as an anode material for sodium and calcium ion batteries: A density functional theory study", Carbon, Apr. 18, 2018, Australia, 12 pages.

Dasgupta el al., "Atomic Layer Deposition of Platinum Catalysts on Nanowire Surfaces for Photoelectrochemical Water Reduction", Journal of the American Chemical Society, Aug. 20, 2013, California, 4 pages.

Chao et al., "Nanostructured Platinum Catalysts by Atomic-Layer Deposition for Solid-Oxide Fuel Cells", Advanced Energy Materials, May 15, 2012, California, 4 pages.

An et al., "Ultra-thin platinum catalytic electrodes fabricated by atomic layer deposition", Phys. Chem. Chem. Phys., Mar. 7, 2013, California, 6 pages.

Wu et al., "Core-shell graphene@amorphous carbon composites supported platinum catalysts for oxygen reduction reaction", Chinese Journal of Catalysis, Apr. 20, 2015, China, 6 pages.

M. Karuppannan, Y. Kim, S. Gok, E. Lee, J. Y. Hwang, J.-H. Jang, Y.-H. Cho, T. Lim, Y.-E. Sung and 0. J. Kwon. "A highly durable carbon-nanofiber-supported Pt-C core-shell cathode catalyst for ultra-low Pt loading proton exchange membrane fuel cells: facile carbon encapsulation," Energy & Environmental Science, vol. 12, p. 2820, 2019, 10 pages.

L. Wang, Z. Sofer, and M. Pumera. "Will any crap we put into graphene increase its electrocatalytic effect?," ACS Nano, vol. 14, No. 1, p. 21, 2020, 5 pages.

Jaber-Ansari et al., "Suppressing Manganese Dissolution from Lithium Manganese Oxide Spinel Cathodes with Single Layer Graphene", Adv. Energy Mater. May 2015, 1500646, DOI: 10.1002/aenm.201500646, 10 pages.

Shearer et al., "Accurate thickness measurement of graphene," Nanotechnology, vol. 27, No. 12504, 2016, 10 pages.

* cited by examiner

FUEL CELL GRAPHENE-BASED MATERIAL FOR CAPTURING CATALYST PARTICLES

CROSS-REFERENCE TO RELATED APPLICATIONS

This application is a continuation of U.S. application Ser. No. 16/833,039 filed Mar. 27, 2020, now U.S. Pat. No. 11,631,863 which issued on Apr. 18, 2023.

TECHNICAL FIELD

The present disclosure relates to a fuel cell catalyst material with a defective, carbon-based coating.

BACKGROUND

Fuel cells have shown promise as an alternative power source for vehicles and other transportation applications. Fuel cells operate with a renewable energy carrier, such as hydrogen. Fuel cells also operate without toxic emissions or greenhouse gases. Due to the relatively high costs of the materials in the fuel cell stack, fuel cell technology has seen limited adoption. One of the materials that contributes significantly to the overall cost of the fuel cell stack is the catalyst material, such as platinum catalyst materials. Catalyst materials are included in the catalyst layer of both the anode and the cathode of the fuel cell. The durability of the catalyst materials has an impact on the overall cost of fuel cell technology.

SUMMARY

In a first embodiment, a fuel cell catalyst layer is disclosed. The fuel cell catalyst layer includes a catalyst support, a catalyst material, and a graphene-based material. The catalyst material includes catalyst particles in an atomic form at a beginning of operation or life of the fuel cell catalyst layer. The graphene-based material includes defects capturing dissolved particles ionized from the atomic form after the beginning of operation or life of the fuel cell catalyst layer.

In a second embodiment, a fuel cell is disclosed. The fuel cell includes a polymer electrolyte membrane (PEM) and first and second catalyst layers situating the PEM therebetween. The first catalyst layer includes a first catalyst support, a first catalyst material including first catalyst particles in an atomic form at a beginning of operation or life of the fuel cell, and a first graphene-based material including first defects capturing first dissolved catalyst particles ionized from the atomic form after the beginning of operation or life of the fuel cell. The second catalyst layer includes a second catalyst support, a second catalyst material including second catalyst particles in the atomic form at the beginning of operation or life of the fuel cell, and second graphene-based material including second defects capturing second dissolved catalyst particles ionized from the atomic form after the beginning of operation or life of the fuel cell, thereby reducing loss of active catalyst particles.

In a third embodiment, a method of operating a fuel cell is disclosed. The method includes beginning operation of the fuel cell at a beginning of operation or life. The fuel cell includes a polymer electrolyte membrane (PEM) and first and second catalyst layers situating the PEM therebetween. The first catalyst layer includes a first catalyst support, a first catalyst material including first catalyst particles in an atomic form at a beginning of operation or life of the fuel cell, and a first graphene-based material including first defects capturing first dissolved catalyst particles ionized from the atomic form after the beginning of operation or life of the fuel cell. The second catalyst layer includes a second catalyst support, a second catalyst material including second catalyst particles in the atomic form at the beginning of operation or life of the fuel cell, and second graphene-based material including second defects capturing second dissolved catalyst particles ionized from the atomic form after the beginning of operation or life of the fuel cell. The method further includes capturing, within the first defects, first dissolved catalyst particles ionized from the atomic form after the beginning of operation or life and during operation of the fuel cell to form first captured catalyst particles. The method further includes capturing, within the second defects, second dissolved catalyst particles ionized from the atomic form after beginning of operation or life and during operation of the fuel cell to form second captured catalyst particles.

DETAILED DESCRIPTION

Figure 1:
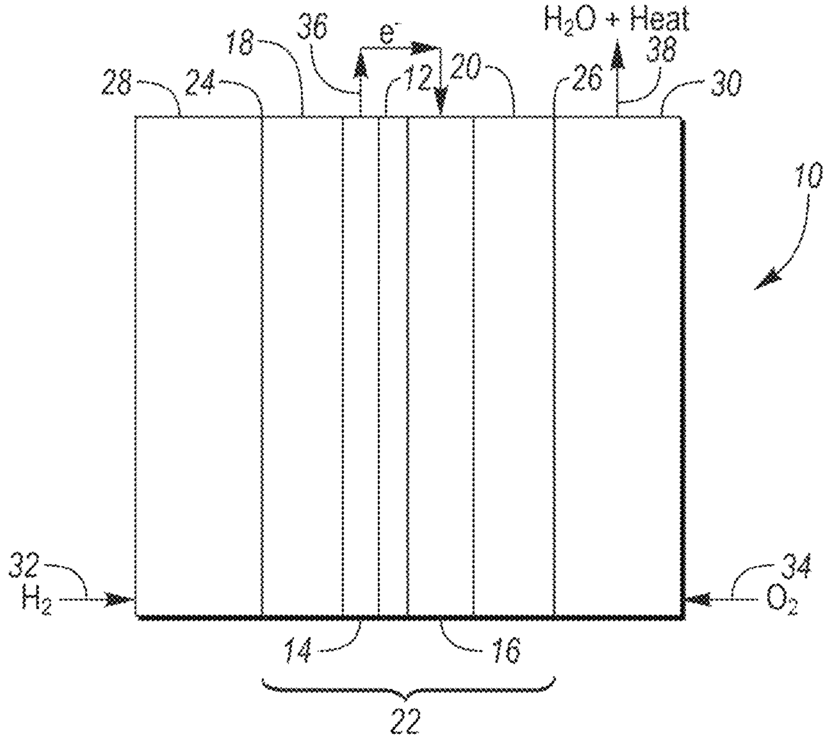
FIG. 1 depicts a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify any value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and a relatively high dependency on non-renewable fossil fuels as energy carriers in the transportation sector, there is an ever increasing need to develop and commercialize transportation technologies that use clean and sustainable sources of energy. One technology that possesses promise is a fuel cell. A fuel cell uses oxygen from air and a compressed hydrogen fuel as fuel sources, while only emitting water and heat. The widespread adoption of fuel cells would reduce carbon dioxide emissions. However, widespread adoption requires further technological development. One area for further technological development is improvement of the durability of the catalyst materials in the fuel cell.

FIG. 1 depicts a schematic, side view of fuel cell 10. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 are bounded by flow fields 28 and 30, respectively. Flow field 28 supplies hydrogen fuel, e.g. $H_2$, to MEA 22, as signified by arrow 32. Flow field 30 supplies $O_2$ to MEA 22, as signified by arrow 34. A catalyst material, such as platinum, is used in anode 14 and cathode 16. The catalyst material is commonly the most expensive constituent of MEA 22.

At anode 14, the catalyst material (such as platinum) catalyzes a hydrogen oxidation reaction (HOR) (e.g. $H_2 \rightarrow 2H^+ + 2e^-$), which creates a flow of electrons through conduit 36 (such as a wire). At cathode 16, the catalyst material catalyzes an oxygen reduction reaction (ORR) ($\frac{1}{2}O_2 + 2H^+ + 2e^- \rightarrow H_2O$), wherein the electrons are supplied from conduit 36. The $H_2O$ from the ORR and heat exit fuel cell 10 through second flow field 30, as represented by arrow 38. The loading of the catalyst material in cathode 16 is higher than the loading in anode 14 because the kinetics of the ORR are significantly slower than the kinetics of the HOR. A loading of anode 14 as low as 0.025 $mg_{Pt}/cm^2$ may result in kinetic losses of less than or equal to 20 mV for the HOR. A loading of cathode 16 of 0.1, 0.2, 0.3 or 0.4 $mg_{Pt}/cm^2$ may result in kinetic losses of greater than or equal to 400 mV.

During the operation of fuel cell 10, the catalyst material may undergo degradation at anode 14 and cathode 16, resulting in an increase in kinetic overpotentials experienced by fuel cell 10 over time. A variety of phenomena may result in degradation of a catalyst material in a fuel cell. Catalyst loading variations in cathode 16 during operation of fuel cell 10 may result in changes in cathode potential, for example, a change of any of the following values or within a range thereof: 0.7, 0.8, 0.9 and 0.95 V. This level of cathode potential change may lead to degradation of the catalyst material in cathode 16. Start-up and shut-down effects or local fuel starvation effects may lead to degradation of the catalyst material in anode 14. Because substantial reduction in catalyst material loading may significantly help reach cost targets for fuel cell 10, identifying systems, structures and methods for reducing catalyst material degradation would help satisfy beginning-of-life (BOL) and end-of-life (EOL) performance metrics.

According to one proposal, platinum nanoparticles encapsulated with carbon may be used as a PEM fuel cell catalyst material. The platinum nanoparticles may be co-synthesized using a combination of aniline and $H_2PtCl_6 \cdot 6H_2O$ hydrated salt and carbon nanofibers (CNFs) resulted in platinum nanoparticle catalysts encapsulated by a relatively thin carbon layer attached on CNF surfaces. The chemical reactions forming the encapsulation structure, the chemical structure of the encapsulation shell and the protection mechanisms are not disclosed or suggested by this proposal.

What is needed are defective, carbon-based coating compositions and processes to form such compositions using precursor metal salts and precursor hydrocarbons to improve PEM fuel cell performance by reducing catalyst material degradation to help satisfy BOL and EOL performance metrics. Aspects of the present disclosure are directed to the use of first-principles density functional theory (DFT) and/or ab-initio molecular dynamics (AIMD) algorithms, calculations and/or methodologies to discover the chemical reactions between precursor metal salts and precursor hydrocarbons to produce such defective, carbon-based coating compositions.

Figure 2:
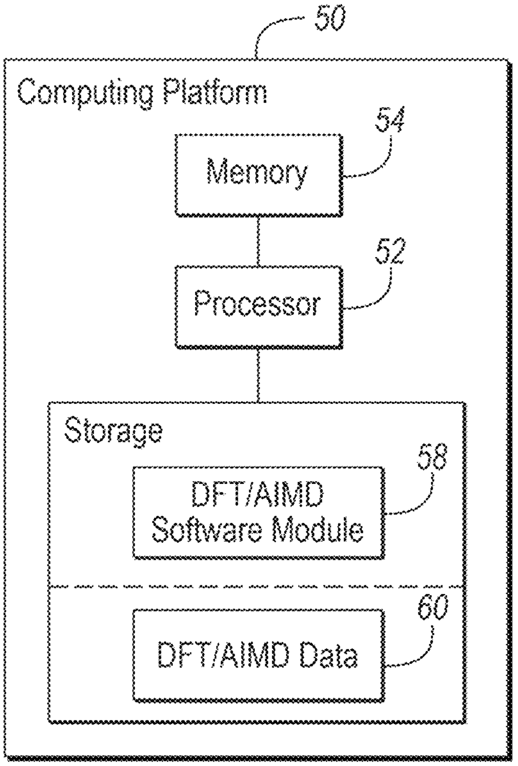
FIG. 2 is a schematic diagram of a computing platform that may be utilized to implement density functional theory (DFT) and/or ab-initio molecular dynamics (AIMD) algorithms, calculations and/or methodologies of one or more embodiments.

The DFT and/or AIMD algorithms, calculations and/or methodologies of one or more embodiments are implemented using a computer platform, such as the computing platform 50 illustrated in FIG. 2. The computing platform 50 may include a processor 52, memory 54, and non-volatile storage 56. The processor 52 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid-state device, cloud storage or any other device capable of persistently storing information.

Processor 52 may be configured to read into memory 54 and execute computer-executable instructions residing in DFT/AIMD software module 58 of the non-volatile storage 56 and embodying DFT and/or AIMD algorithms, calculations and/or methodologies of one or more embodiments. Software module 58 may include operating systems and applications. Software module 58 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 52, the computer-executable instructions of the DFT and/or AIMD software module 58 may cause the computing platform 50 to implement one or more of the DFT and/or AIMD algorithms and/or methodologies disclosed herein. Non-volatile storage 56 may also include DFT/AIMD data 60 supporting the functions, features, calculations, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

In one or more embodiments, DFT and/or AIMD algorithms, calculations and/or methodologies demonstrate that certain chemical reactions between a precursor metal salt and a precursor hydrocarbon molecule produce defective, carbon-based, aromatic cyclic group-containing compositions. These compositions can be used as catalysts in the cathode and/or anode of fuel cells to produce a cost-effective protection mechanism for catalyst materials to increase the catalyst material operation lifetime. The DFT and/or AIMD algorithms, calculations and/or methodologies show that Pt—Pt bonds are present as part of a catalyst material forming from the precursor metal salt and Pt—C bonds are present between the defective, carbon-based, aromatic cyclic group-containing compositions and the catalyst material. The DFT and/or AIMD algorithms, calculations and/or methodologies further show that a dopant may be added as a reactant in the chemical reaction to dope the defective, carbon-based coating composition. As shown herein, the dopant may promote better bonding between the defective, carbon-based coating composition and the catalyst material, thereby enhancing electrocatalytic performance of a fuel cell using the catalyst material with the defective, carbon-based coating. In one or more embodiments, n-type nitrogen (N) and p-type boron (B) doping may promote a stronger binding of the defective, carbon-based coating composition to the catalyst material, further demonstrating that doping may positively affect the interface between the catalyst material and the carbon in the carbon network. In one or more embodiments, a number of defective graphite precursor hydrocarbon molecules are disclosed that can participate in the precursor reaction to produce defective, carbon-based, aromatic cyclic group-containing compositions. The catalyst material may be platinum. The catalyst material may be a nano-sized catalyst material.

In one embodiment, a fuel cell catalyst material at least partially coated with a defective, carbon-based coating material may be formed by a chemical reaction between $H_2PtCl_6 \cdot 6H_2O$ as a precursor metal salt and aniline as a precursor hydrocarbon molecule. During the chemical reaction of this pair of precursors, Pt-aniline complexes may be formed. Upon coating a catalyst support surface (e.g. carbon nanofibers) with the Pt-aniline complexes, and subsequently annealing at 600 to 900° C. in a nitrogen ($N_2$) atmosphere, a relatively thin defective, carbon-based coating material forms at the surface of the platinum nanoparticles from the precursor hydrocarbon molecules. In one or more embodiments, ab-initio molecular dynamics (AIMD) are used to discern the types of chemical reactions that occur during the annealing process and to discern the nanostructure that forms after the chemical reaction.

An AIMD molecular dynamics simulation using first principles calculation such as DFT may be used to calculate the atomic forces on each atom in a molecule. Correspondingly, AIMD may be used to create a virtual atomic-scale chemical reactor including chemical precursors simulated at a relatively high temperature to observe chemical reactions happening between the precursors in the AIMD virtual atomic-scale chemical reactor. In the context of this chemical reaction, $H_2PtCl_6 \cdot 6H_2O$ hydrate salt initially dissociates in an aqueous environment into $PtCl_6^{2-}$ anions and $H_3O^+$ cations. Hence, 3 $PtCl_6^{2-}$ anions, 6 $H_3O^+$ cations, 12 $H_2O$ molecules, 12 aniline molecules, and 10 $N_2$ molecules are placed in the virtual atomic-scale chemical reactor (a periodic cube with a fixed side length (e.g. 15 Å), thereby totaling to 269 atoms. Given the relatively large number of atoms in the virtual atomic-scale chemical reactor, the AIMD simulation is run at an elevated temperature (e.g. 2,000K) that is higher than the real, physical annealing temperature (e.g. 900° C.). In one embodiment, four (4) different AIMD simulations were run using these precursors placed in the virtual atomic-scale chemical reactor (with different random initial positions and orientations of molecules at high density with intermolecular distances between the molecules (e.g. greater than or equal to a certain value (e.g. 2 Å)) for a predetermined amount of simulation time to observe the graphitization reaction (i.e., C—C bond formation) as well as Pt—C bond formation. The predetermined amount of simulation time may be any of the following values or in a range of any two of the following values: 40, 41, 42, 43, 44, 45, 46, 47, 48, 49 and 50 picoseconds (ps).

Figure 3:
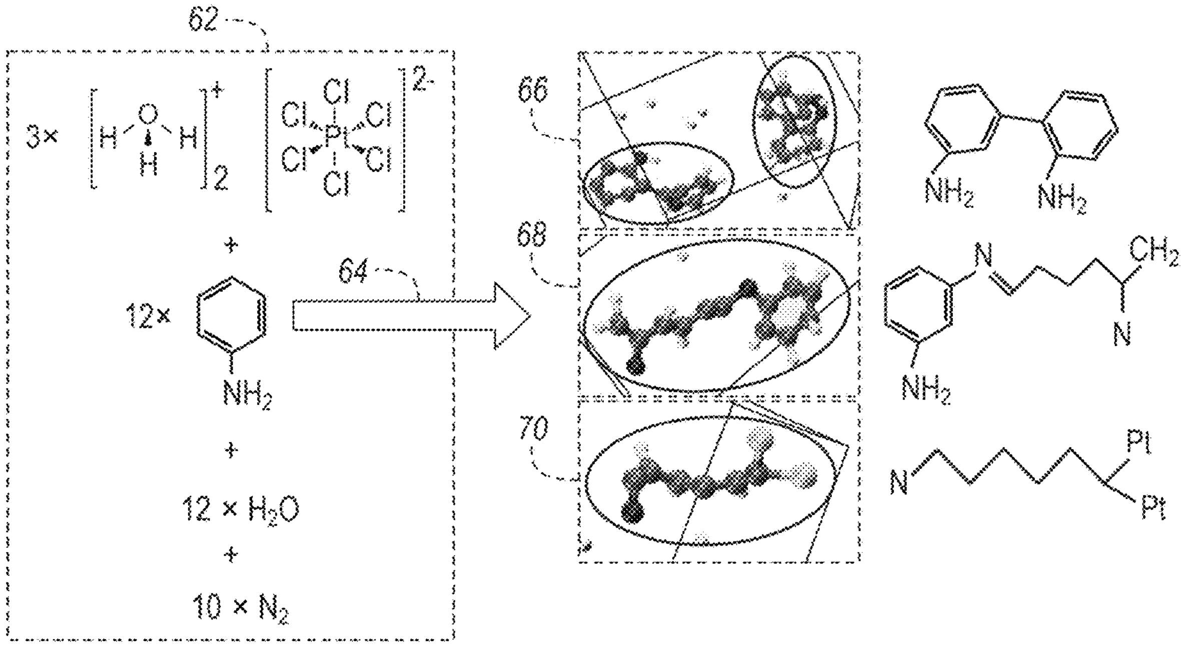
FIG. 3 is a schematic diagram depicting the formation of Pt—C bonds from an AIMD simulation of a chemical reaction after an annealing process of Pt-hydrate salt with aniline in water under an inert $N_2$ atmosphere.

FIG. 3 is a schematic diagram depicting the formation of Pt—C bonds from an AIMD simulation of a chemical reaction after an annealing process of Pt-hydrate salt with aniline in water under an inert $N_2$ atmosphere. Dotted box 62 depicts the 3 $PtCl_6^{2-}$ anions, 6 $H_3O^+$ cations, 12 $H_2O$ molecules, 12 aniline molecules, and 10 $N_2$ molecules placed in the virtual atomic-scale chemical reactor. Arrow 64 signifies the AIMD simulation of a chemical reaction after an annealing process of the Pt-hydrate salt with aniline in water under an inert $N_2$ atmosphere. Dotted box 66 depicts a ring-ring formation of two aniline groups. Dotted box 68 depicts an aniline ring opening and attaching to a complete aniline ring. Dotted box 70 depicts an aniline ring opening and attaching to Pt atoms. The concentration of ring-ring bond formations dominates the three different molecules shown in dotted boxes 66, 68 and 70. According to one AIMD simulation, about 33% of the aniline molecules form the ring-ring bond shown in box 66, about 16% or less of the aniline molecules form the ring-chain bond shown in box 68 and about 3% or less of the aniline molecules form the chain-platinum bond formation of box 70. The AIMD simulation was performed at a relatively high temperature of 2000K, which is significantly higher than the typical experimental processing temperature. Accordingly, the concentration found in the reacted molecules with the AIMD simulation may not match what is achieved experimentally.

In one or more embodiments, the resulting Pt nanoparticle formation undergoes similar processing conditions as depicted in FIG. 3. The hydrocarbon molecules form a matrix of angstrom-sized nanopores due to ring to ring bond formation, which may be separated by a relatively low number of carbon atom chains, which form from the ring opening reaction. The angstrom-sized nanopores may be any of the following values or in a range of any two of the following values: 0.5, 1, 2, 3, 4, 6, 8, 10 and 12 angstroms. The relatively low number of carbon atom chains may be 2, 3, 4, 5, and 6. Some of the relatively low number of carbon atom chains may also form the Pt—C bond with the catalyst nanoparticles. The following advantages may be achieved by implementing the defective, carbon-based coating compositions of one or more embodiments: (1) minimal mass transport hindrance for thin carbon encapsulation ($O_2$, $H_3O^+$, $H_2$, other hydrogen fuel and $H_2O$ can pass through the atomically porous structure), (2) Pt nanoparticle agglomerate formation (which reduces the catalyst activity) is reduced in the PEM fuel cell, resulting in significantly less reduction in PEM fuel cell performance after 30,000 cycles of operation, (3) the atomic porosity likely reduces the ability of sulfonate groups of the PEM fuel cell ionomer to directly stick to the catalyst nanoparticle surface, which would kill its catalytic activity and/or (4) reduce Pt dissolution from the surface of the catalyst nanoparticle.

Figure 4:
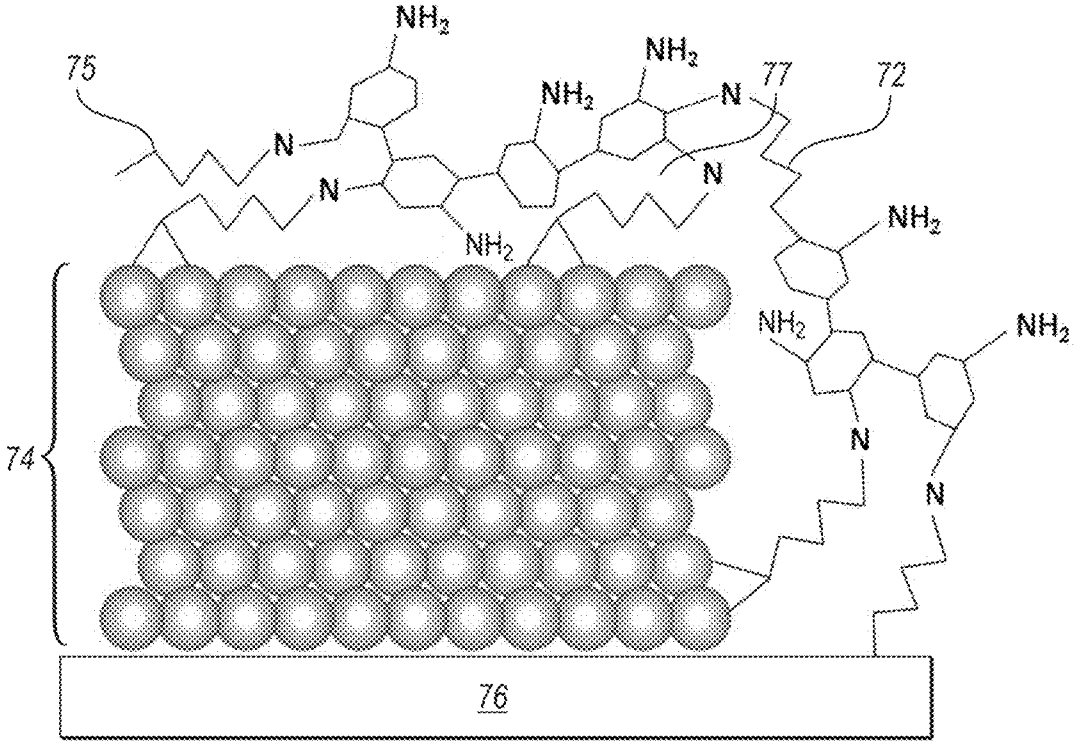
FIG. 4 is a schematic diagram of a fuel cell catalyst material with a defective, carbon-based coating according to one embodiment.

FIG. 4 depicts a schematic diagram of defective, carbon-based coating composition 72 at least partially coating the surfaces of catalyst material 74. In one or more embodiments, the carbon-based coating composition is an imperfect, multi-layer 3D carbon structure with aromatic cyclic carbon groups therein. The thickness may be in the range of 2 to 3 layers of a graphene-like material or about 1 nanometer thick. In other embodiments, the carbon-based coating composition may be relatively two-dimensional. The carbon-based coating composition may have a sp2 carbon structure and/or a graphite-like structure. In one embodiment, the carbon-based coating composition has greater than or equal to 75% sp2 hybridization. In other embodiments, the sp2 hybridization may be greater than or equal to 25% or 50%. Defective, carbon-based coating composition may include carbon network 75 and atomic defects 77. Catalyst material 74 may be a nanosized, platinum, platinum-cobalt, platinum-nickel, or any other metallic nanostructure catalyst material. Catalyst material 74 is supported on catalyst support 76. In one or more embodiments, defective, carbon-based coating composition 72 is doped with one or more dopants. As shown in FIG. 4, defective, carbon-based coating composition 72 is doped with nitrogen (N), i.e., n-type doping in graphene. The N-doping may promote stronger binding of defective, carbon-based coating composition 72 to the surface of catalyst material 74. In one or more embodiments, defective, carbon-based coating composition 72 may also be doped with boron (B), p-type dopant, in addition to N-doping or as an alternative to N-doping. The thickness of defective, carbon-based coating composition 72 may be any of the following values or in a range of any two of the following values: 0.1, 0.5, 0.6, 0.7, 0.8, 0.9 and 1.0 nanometers. In another embodiment, one or more layers of a defective graphene-based coating may be any of the following values or in a range of any two of the following values: 0.2, 0.3, 0.6, 0.9, 1.2, 1.5, 1.8, 2.1, 2.4, 2.7, and 3 nanometers, where the interlayer between two graphene sheets (e.g., in graphite) is about 0.3 nanometer, which may be increased or decreased depending on the dopant, pillaring agent, or oxygen functional groups. For example, interlayer distance of graphene oxide (GO) with many oxygen functional groups can have the interlayer distance about 0.85 nanometer. In another embodiment, hydrated cation such as Li+, Na+, and K+ ions may change the interlayer distance of graphene to about 0.935, 0.896, and 0.882 nanometers, respectively.

As shown in FIG. 4, defective, carbon-based coating composition 72 includes a number of atomic defects 77. The size of the atomic defects may be any of the following values or in a range of any two of the following values: 0.1, 0.2, 0.3, 0.4, 0.5, 0.6, 0.7, 0.8, 0.9 and 1.0 nanometers. In another embodiment, one or more layers of a defected graphene coating may be any of the following values or in a range of any two of the following values: 0.2, 0.3, 0.6, 0.9, 1.2, 1.5, 1.8, 2.1, 2.4, 2.7, and 3 nanometers, where the interlayer between two graphene sheets (e.g., in graphite) is about 0.3 nanometer, which may be increased or decreased depending on the dopant, pillaring agent, oxygen functional groups. The size of the atomic defects may be controlled based on the type of precursor hydrocarbon molecule used. In certain embodiments, the size of the atomic defects may be the size of the vacated number of carbons because of the defects. The number of vacated carbons may be any of the following values and/or a range of any two of the following values: 1, 2, 3, 4, 5 and 6 vacated carbons. The vacated carbons may be the result of unravelling of the aromatic ring(s) of the precursor hydrocarbon molecule. The defects may be the graphene-based defects disclosed in U.S. patent application Ser. Nos. 16/544,511 and 16/694,305, which are hereby incorporated by reference in their entirety.

Figure 5A:
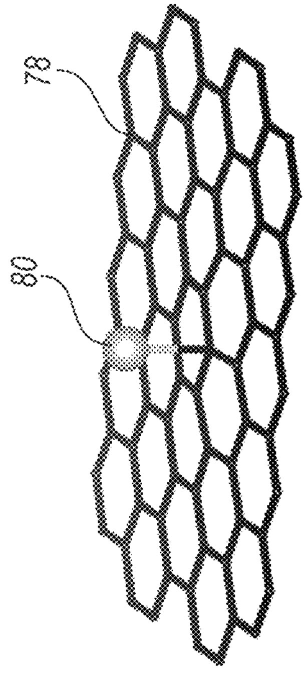
FIGS. 5A through 5C are schematic diagrams showing the chemical interfaces between a pure graphene sheet and a Pt atom, a N-doped graphene sheet and a Pt atom, and a B-doped graphene sheet and a Pt atom, respectively.
Figure 5B:
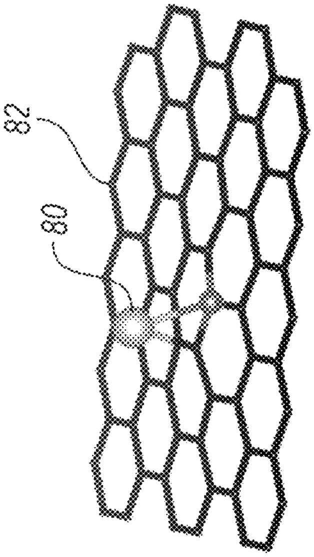
Figure 5C:
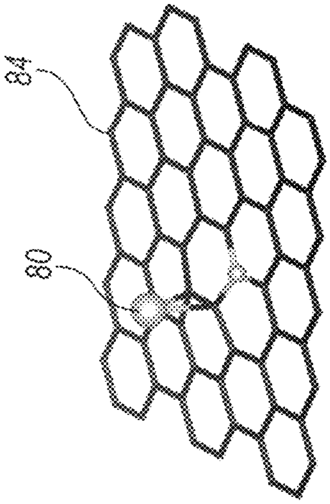

DFT and/or AIMD algorithms, calculations and/or methodologies demonstrate the interaction between defective, carbon-based coating composition 72 and catalyst material 74. DFT and/or AIMD algorithms, calculations and/or methodologies were utilized to build a chemical interface between pure graphene sheet 78 and Pt atom 80, as shown in FIG. 5A. DFT and/or AIMD algorithms, calculations and/or methodologies were also utilized to build a chemical interface between B-doped graphene sheet 82 and Pt atom 80, as shown in FIG. 5B, a chemical interface between N-doped graphene sheet 84 and Pt atom 80, as shown in FIG. 5C. Table 1 includes the relative DFT binding energies between Pt atom 80 and doped-graphene sheets 82 and 84, referenced to pure graphene sheet 78. As shown in Table 1, the binding energies become more negative once the graphene is doped with B and/or N.

TABLE 1

| Unit: e V/site | Graphene | B-doped Graphene | N-doped Graphene |
|---|---|---|---|
| Relative Pt binding energy | 0 (reference) | −0.848 | −0.527 |

It is unexpected that the p-type B-doping and n-type N-doping in graphene may contribute to Pt bindings, because B-doping and N-doping in graphene should lead to an opposite effect (i.e. electron donating versus electron withdrawing).

Figure 6A:
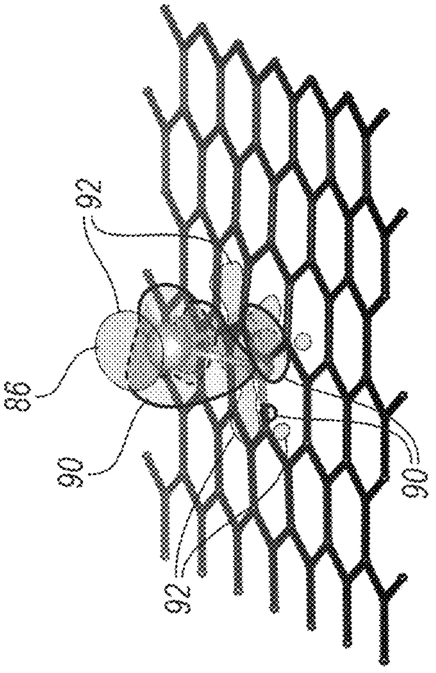
FIGS. 6A and 6B are schematic diagrams of simulated electron density difference isosurface plots for a chemical interface between a B-doped graphene sheet and a Pt atom and a chemical interface between a N-doped graphene sheet and a Pt atom, respectively.
Figure 6B:
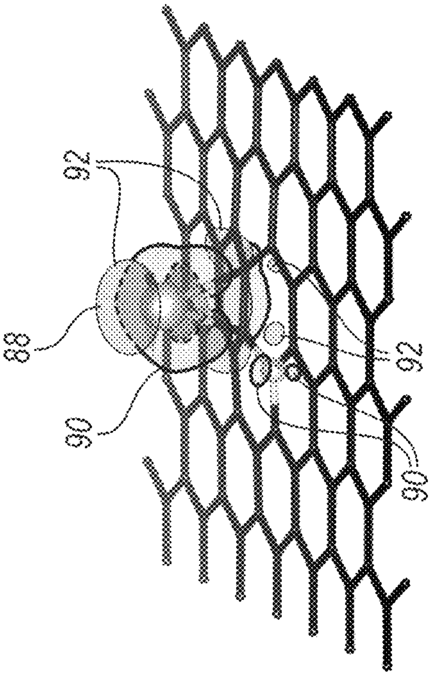

FIG. 6A is a schematic diagram of simulated electron density difference isosurface plot 86 for the chemical interface between B-doped graphene sheet 82 and Pt atom 80. FIG. 6B is a schematic diagram of simulated electron density difference isosurface plot 88 for the chemical interface between N-doped graphene sheet 84 and Pt atom 80.

First and second shaded regions 90 and 92 correspond to electron accumulation and depletion regions, respectively (±0.003 e·Å$^3$). For the B-doped case shown in FIG. 6A, it is observed that Pt forms a chemical bond with both boron and carbon (B—Pt—C type bond). In contrast, as shown in FIG. 6B, Pt likes to form a chemical bond away from nitrogen (C—Pt—C type bond). As shown in FIG. 5A, Pt solely forms a single bond with carbon (Pt—C bond) for the pure graphene case. Therefore, forming two single bonds with Pt in the doped graphene system partly explains more favorable binding between the Pt atom and doped graphene systems. In addition, it is observed in FIG. 6A that the B-doped graphene has more electron depletion region (second shaded region 92) on boron, compared with nitrogen shows more electron accumulating phenomenon around the nitrogen atom in the N-doped graphene. This initially explains that B and N doping leads to opposite effect such as electron donating versus withdrawing. However, the Pt atom rather moves away from the nitrogen atom and forms a chemical bond with two adjacent carbon atoms, this also significantly affects the relative binding energy by ~0.5 eV. However, adding a boron instead of nitrogen can also greatly affect the relative binding energy, where Pt has an affinity to directly bond on the boron atom (relative binding energy affected by ~0.8 eV). In one or more embodiments, both electron donating and withdrawing dopants in graphene can help with Pt binding, either directly by binding Pt more strongly (e.g. p-type B-doping) or by affecting the nearest neighbored carbon atom located adjacent to the dopant (e.g. n-type N-doping).

Based on our findings above with $H_2PtCl_6{\cdot}6H_2O$ as a precursor metal salt and aniline as a precursor hydrocarbon molecule, the primary chemical reaction involved in the formation of the defective, carbon-based coating composition is the C—C bond formation between the C—H sections of the two aniline molecules. In one or more embodiments, precursor hydrocarbon molecules having aromatic cyclic groups create defective, carbon-based coating compositions similar to the one shown in FIG. 4. In one or more embodiments, one or more N atoms, B atoms, S atoms, P atoms, O atoms, Si atoms, Al atoms and combinations thereof may be doped into the defective, carbon-based coating composition to further improve the Pt—C bond and/or the electrocatalytic properties of the PEM fuel cell. As shown, Cl atoms are not typically incorporated in the defective, carbon-based coating composition. Accordingly, in one or more embodiments, platinum-based salts other than $H_2PtCl_6{\cdot}6H_2O$ may be used as the precursor metal salt. Correspondingly, Table 2 identifies a broad range of alternative chemistries which can be used as the precursor metal salt to yield a defective, carbon-based composition at least partially coating a fuel cell catalyst material. The initial precursor may be any structure that includes one or more aromatic cyclic groups of n numbers of carbons (where n equals 4 to 12 carbons) bonded to each other and/or one or more N, B, S, P and O atoms. The platinum salt may be $H_2PtCl_6$ (in hydrate, solution and/or hexahydrate form). Other non-limiting examples for the platinum salt include $PtCl_n$ or $Pt(NH_3)_2Cl_n$ (for n=2 to 4). The use of a platinum salts including N may be beneficial to increase the amount of N doped into the carbon network.

TABLE 2

| Name | Structure |
|---|---|
| Aniline | 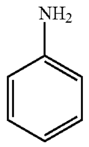 |
| phenylborane | 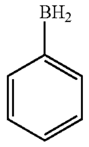 |

TABLE 2-continued

| Name | Structure |
|---|---|
| phenylsilane | 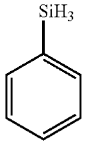 |
| benzenethiol | 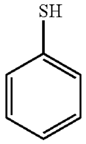 |
| Phenol | 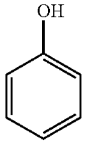 |
| benzene-1,3-diol | 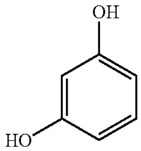 |
| benzene-1,3,5-triol | 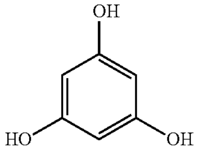 |
| benzene-1,4-diamine | 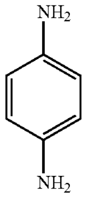 |
| benzene-1,3-dithiol | 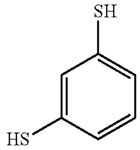 |
| benzene-1,4-dithiol | 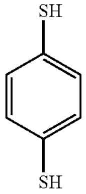 |
| benzene-1,3,5-triamine | 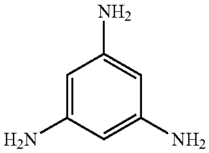 |

TABLE 2-continued

| Name | Structure |
|---|---|
| triboranylbenzene-1,3,5-triamine | 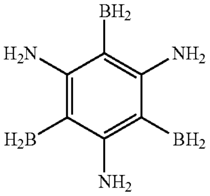 |
| benzene-1,3,5-trithiol | 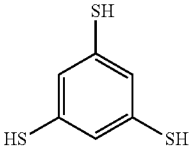 |
| 4-boranylaniline | 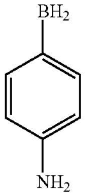 |
| 2,6-diaminobenzene-1-thiol | 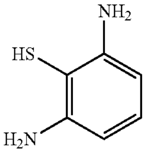 |
| 2-amino-6-methylbenzene-1-thiol | 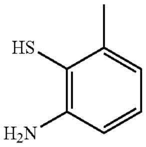 |
| 3-amino-2-sulfanylphenol | 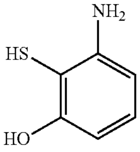 |
| 2-sulfanylbenzene-1,3-diol | 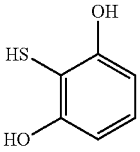 |
| 2-amino-4-sulfanylphenol | 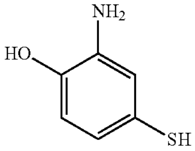 |
| 2-aminophenol | 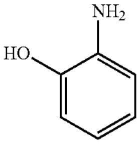 |

TABLE 2-continued
| Name | Structure |
|---|---|
| 2,3-diaminophenol | 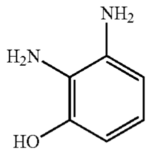 |
| 3-aminobenzene-1,2-diol | 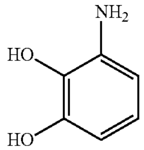 |
| 4-(4-aminophenyl)aniline | 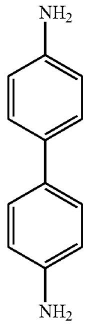 [SMILES: Nc1ccc(-c2ccc(N)cc2)cc1] |
| 4-phenylbenzene-1-thiol | 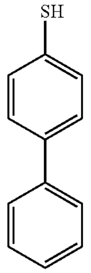 [SMILES: Sc1ccc(-c2ccccc2)cc1] |
| 4-phenylphenol | 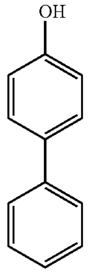 [SMILES: Oc1ccc(-c2ccccc2)cc1] |
| 4-(4-phenylphenyl)benzene-1-thiol | 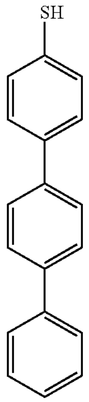 [SMILES: Sc1ccc(-c2ccc(-c3ccccc3)cc2)cc1] |
| 4'-boranyl-[1,1'-biphenyl]-4-amine | 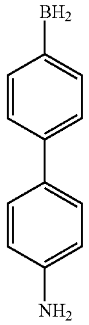 |
| 10-boranylanthracen-9-amine | 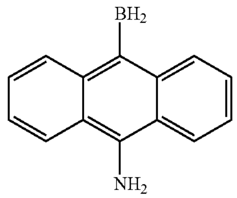 |
| anthracene-9-thiol | 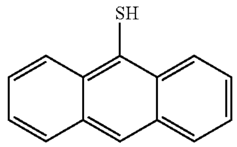 [SMILES: Sc1c2ccccc2cc2ccccc12] |
| anthracene-9,10-dithiol | 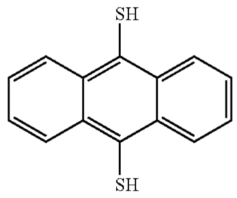 [SMILES: Sc1c2ccccc2c(S)c2ccccc12] |
| anthracene-9,10-diol | 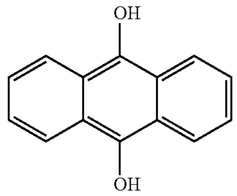 [SMILES: Oc1c2ccccc2c(O)c2ccccc12] |

TABLE 2-continued

| Name | Structure |
|---|---|
| 4-aminoanthracen-9-ol | 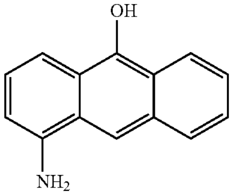 [SMILES: Nc1cccc2c(O)c3ccccc3cc12] |
| N,N-diphenylaniline | 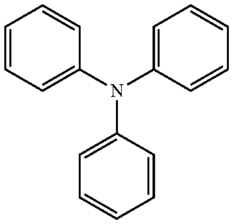 [SMILES: c1ccc(N(c2ccccc2)c2ccccc2)cc1] |
| triphenylborane | 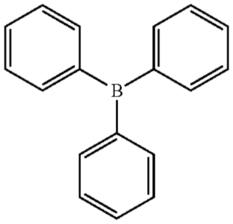 [SMILES: c1ccc(B(c2ccccc2)c2ccccc2)cc1] |
| 1H-phenalen-1-amine | 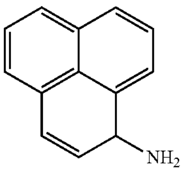 [SMILES: NC1C=Cc2cccc3cccc1c23] |
| 1H-phenalene-1,9-diamine | 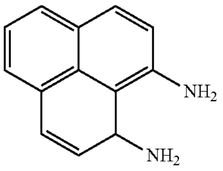 [SMILES: Nc1ccc2cccc3c2c1C(N)C=C3] |
| 1H-phenalen-1-ol | 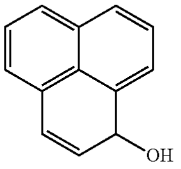 [SMILES: OC1C=Cc2cccc3cccc1c23] |
| 1H-phenalene-1,9-diol | 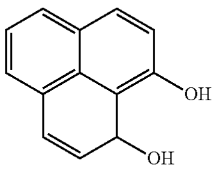 [SMILES: Oc1ccc2cccc3c2c1C(O)C=C3] |
| 9-amino-1H-phenalen-1-ol | 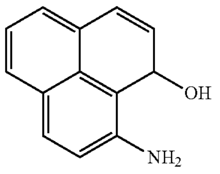 |

TABLE 2-continued

| Name | Structure |
|---|---|
| 1H-inden-1-amine | 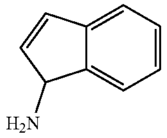 |
| 1H-inden-1-ol | 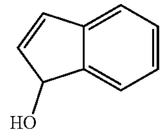 |
| 9H-fluoren-9-amine | 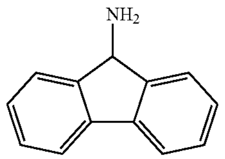 [SMILES: NC1c2ccccc2-c2ccccc21] |

In one or more embodiments, fuel cell catalyst materials with a defective, carbon-based coating are disclosed that are tailored by controlling the atomic and molecular interfaces between the defective, carbon-based coating and the catalyst material. The defective, carbon-based coating compositions are configured to suppress metal dissolution of Pt and Pt-alloy catalysts in PEM fuel cells environments, thereby providing relatively long-term stability to PEM fuel cells.

In one or more embodiments, a fuel cell catalyst material is disclosed. The fuel cell catalyst material includes metal catalyst particles formed of a metal material. The mean diameter of the metal material may be on a nanoscale. The metal material may include or be completely formed of pure Pt, Pt-M alloy (M=Co, Ni, or another metal from the periodic table), other platinum group members (PGM) metals (e.g. Ru, Rh, Pd, Os, Ir), PGM-M (or, Pt-PGM-M) alloy system, non-PGM catalyst material, and combinations thereof.

The fuel cell catalyst material may further include a carbon-based coating composition at least partially coating (or totally coating) at least some of the metal catalyst particles. The defective, carbon-based coating composition may include a carbon network. The carbon-based coating composition may be doped with a dopant. Non-limiting examples of dopants include N, B, P, S, O, Si, Al, Cl and/or F atoms. The dopant atoms may be bonded within the carbon network, or physically located on the carbon-based coating. The thickness of the defective, carbon-based coating composition may be any of the following values or in a range of any two of the following values: 0.2, 0.5, 0.75, 1.0, 1.25, 1.5, 1.75 and 2.0 nanometers. In another embodiment, one or more layers of a defected graphene coating may be any of the following values or in a range of any two of the following values: 0.2, 0.3, 0.6, 0.9, 1.2, 1.5, 1.8, 2.1, 2.4, 2.7, and 3 nanometers, where the interlayer between two graphene sheets (e.g., in graphite) is about 0.3 nanometer, which may be increased or decreased depending on the dopant, pillaring agent, oxygen functional groups. These thicknesses may provide acceptable mass transport of species involved in the ORR catalytic reaction. The catalyst material may be configured to mitigate catalyst material atom degradation. Mitigation of catalyst degradation may have one or more of the following benefits: (1) reducing electrochemical surface active area (ECSA) loss, (2) preventing catalyst ion migration to the interface between polymer electrolyte membrane (PEM) and catalyst layer or into PEM, and/or (3) preventing catalyst nanoparticle aggregation through the anchors provided by the graphite encapsulation, thus potentially suppressing PEM degradation. The addition of the defective, carbon-based coating composition may affect and/or enhance the mass transport of $H_2O$, $O_2$, $H_3O^+$ groups through the defect sites, in addition to increasing the binding between the defective, carbon-based coating composition and the metal catalyst particles.

A portion of or the entirety of the graphene-based coating composition may be in direct contact with the metal catalyst particles in a catalyst layer (i.e. anode and/or cathode catalyst layers). A portion of or the entirety of the carbon-based coating composition may be loosely bound to the metal catalyst particles at a mean distance. The mean distance of the layer that is closest to the particles may be any of the following values or in a range of any two of the following values: 0.2, 0.5, 0.75, 1.0, 1.25, 1.5, 1.75 and 2.0 nanometers.

The carbon-based coating composition may include a number of defects configured to capture dissolved catalyst particle metal species ionized from the atomic form of these catalyst particles. The captured catalyst particles (e.g. Pt catalyst particles) may still act as a catalyst since the captured catalyst particles are in a contact with a conductor (i.e., the defective, carbon-based coating composition). Fewer catalyst particles may migrate toward the PEM, thereby reducing electrochemical surface active (ECSA) area loss. Since there is less catalyst particle redeposit on to the PEM, this may potentially lead to less PEM degradation. Preventing the loss of ECSA and PEM degradation may increase the PEM fuel cell lifetime. During a negative sweep, the catalyst material on the defects may be ionized, released and re-deposited within the catalyst layer.

The defective, carbon-based coating composition may be configured to prevent catalyst particle agglomeration through anchoring. The defective, carbon-based coating composition may be configured to allow the transport of $H_2$ and/or other reactant/products of the fuel cell, depending on the operation voltage of the PEM fuel cell.

The defective, carbon-based coating composition may also contain oxygen functional groups such as epoxy (—O—), carbonyl (═O), carboxylic (—COOH), and/or hydroxyl (—OH). The oxygen functional groups may optimize the transport and diffusion of Pt, $H_2$, other hydrogen fuel, $O_2$, and $H_2O$. The defective, carbon-based coating composition may contain nitrogen functional groups (—$NH_2$, etc.), sulfur functional groups (—SH, etc.), phosphorus functional groups (—$PH_3$, etc.) and/or boron functional groups (—$BH_2$, etc). In another embodiment, a combination of these dopants may also be used simultaneously. The carbon rings, which may have 4 to 12 carbons (but typically 6), may be attached linearly in a one-dimensional chain, or to each other as in graphene, or linked via a linker atom (e.g. B, P, S, B, N), or some combination above.

The fuel cell catalyst materials of one or more embodiments may be mixed with commercially-available catalyst materials (e.g. unmodified catalyst). For example, pure Pt and/or Pt-alloys (Pt—Ni, Pt—Co) may be used in the anode and the fuel cell catalyst materials of one or more embodiments may be used in the cathode. In another embodiment, either the anode or cathode may use the fuel cell catalyst materials of one or more embodiments in fraction to commercially-available catalyst materials. For example, in a given catalyst electrode material, 5 to 50% of Pt and/or Pt-alloys catalyst may be modified with graphene coating. In another embodiment, more than 50 to 75% of the catalyst materials may be modified with graphene coating, where the rest of materials are commercially-available materials.

The fuel cell catalyst materials of one or more embodiments may be formed by reacting a precursor platinum salt and a precursor hydrocarbon molecule. This reaction forms a catalyst material that includes metal catalyst particles and a defective, carbon-based composition at least partially coating at least some of the metal catalyst particles. In such embodiments, the carbon-based composition coating is formed during the synthesis of the metal catalyst particles. In other embodiments, the carbon-based composition coating is formed after synthesis of the metal catalyst particles that form a portion of the anode and/or cathode layers. The method of forming the catalyst material may use an annealing process, an ion bombardment, a solid-state process, a solution-based method, and/or deposition techniques. These techniques may be followed by a secondary heat treatment in the presence of oxidizing and/or reducing agents, such as air, $O_2$, $N_2$, Ar, $H_2$, other gases, and mixtures thereof.

In another embodiment, the defective, carbon-based coating composition may also prevent catalyst atom dissolution or catalyst nanoparticle agglomeration for other non-PGM catalyst nanoparticles. In order to achieve this purpose, the Pt-salt precursor used for co-synthesis may be replaced by M-salt precursors necessary to synthesize the non-PGM catalyst nanoparticles.

The fuel cell catalyst materials of one or more embodiments may be co-synthesized simultaneously. The coated catalyst particles may be synthesized independently, or in an environment with a catalyst support to tether the coated catalyst particles. The catalyst support may be a carbon support. The carbon support may be formed of nanowires (such as carbon nanotubes, vanadium nitride (VN) and the combination thereof), microparticles (such as micro-sized, high-surface area carbon particles), solid surfaces, and combination thereof.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell catalyst layer comprising:

a catalyst support;

a catalyst material including catalyst particles in an atomic form at a beginning of operation or life of the fuel cell catalyst layer; and a graphene-based material including defects capturing dissolved catalyst particles ionized from the atomic form after the beginning of operation or life of the fuel cell catalyst layer.

2. The fuel cell catalyst layer of claim 1, wherein the captured catalyst particles contact the graphene-based material to maintain a catalytic activity of the captured catalyst particles.

3. The fuel cell catalyst layer of claim 1, wherein the defects capture the dissolved catalyst particles during voltage changes in fuel cell operation.

4. The fuel cell catalyst layer of claim 1, wherein the graphene-based material includes graphene nanoflakes.

5. The fuel cell catalyst layer of claim 4, wherein the graphene nanoflakes are dispersed within the fuel cell catalyst layer.

6. The fuel cell catalyst layer of claim 1, wherein the graphene-based material is coated onto the fuel cell catalyst layer.

7. The fuel cell catalyst layer of claim 1, wherein a portion of the graphene-based material is located a distance of 0.2 to 2.0 nanometers from a portion of the catalyst particles.

8. The fuel cell catalyst layer of claim 1, wherein the catalyst material includes pure Pt, Pt-M alloy where M is a metal, other platinum group members (PGM), PGM-M alloy system, non-PGM catalyst materials, and combinations thereof.

9. The fuel cell catalyst layer of claim 1, wherein the catalyst support is a carbon-based catalyst support.

10. The fuel cell catalyst layer of claim 1, wherein the defects include one or more vacated carbon atoms.

11. A fuel cell comprising:

a polymer electrolyte membrane (PEM);

first and second catalyst layers situating the PEM therebetween, the first catalyst layer including a first catalyst support, a first catalyst material including first catalyst particles in an atomic form at a beginning of operation or life of the fuel cell, and a first graphene-based material including first defects capturing first dissolved catalyst particles ionized from the atomic form after the beginning of operation or life of the fuel cell, the second catalyst layer including a second catalyst support, a second catalyst material including second catalyst particles in the atomic form at the beginning of operation or life of the fuel cell, and second graphene-based material including second defects capturing second dissolved catalyst particles ionized from the atomic form after the beginning of operation or life of the fuel cell, thereby reducing loss of active catalyst particles.

12. The fuel cell of claim 11, further comprising first and second interfaces between first and second catalyst layers, respectively, and the PEM, wherein the first and second interfaces are free of the first and second dissolved catalyst particles during a negative voltage sweep.

13. The fuel cell of claim 11, wherein the PEM is free of the first and second dissolved catalyst particles during a negative voltage sweep.

14. The fuel cell of claim 11, wherein the first and second defects capture the first and second catalyst particles, respectively, during voltage changes in operation of the fuel cell.

15. The fuel cell of claim 11, wherein the first and second graphene-based materials include graphene nanoflakes.

16. The fuel cell of claim 11, wherein the graphene nanoflakes are dispersed within the first and second fuel cell catalyst layers.

17. A method of operating a fuel cell, the method comprising:

beginning operation of the fuel cell at a beginning of operation or life, the fuel cell including a polymer electrolyte membrane (PEM) and first and second catalyst layers situating the PEM therebetween, the first catalyst layer including a first catalyst support, a first catalyst material including first catalyst particles in an atomic form at the beginning of operation or life of the fuel cell, and a first graphene-based material including first defects, the second catalyst layer including a second catalyst support, a second catalyst material including second catalyst particles in the atomic form at the beginning of operation or life of the fuel cell, and second graphene-based material including second defects;

capturing, within the first defects, first dissolved catalyst particles ionized from the atomic form after the beginning of operation or life and during operation of the fuel cell to form first captured catalyst particles; and capturing, within the second defects, second dissolved catalyst particles ionized from the atomic form after beginning of operation or life and during operation of the fuel cell to form second captured catalyst particles.

18. The method of claim 17, further comprising preventing the first and second dissolved catalyst particles from migrating into the PEM.

19. The method of claim 17, wherein the fuel cell includes first and second interfaces between first and second catalyst layers, respectively, and the PEM, and further comprising preventing the first and second dissolved catalyst particles from migrating into the first and second interfaces.

20. The method of claim 17, further comprising negative sweeping the fuel cell to ionize the first and second captured catalyst particles to form ionized first and second captured catalyst particles and to redeposit the ionized first and second captured catalyst particles within the first and second catalyst layers, respectively.

* * * * *